(12) United States Patent
Kanbe et al.

(10) Patent No.: US 10,909,432 B2
(45) Date of Patent: Feb. 2, 2021

(54) TWO-DIMENSIONAL CODE COMPOSED OF A PLURALITY OF TYPES OF CELLS

(71) Applicant: DENSO WAVE INCORPORATED, Chita-gun (JP)

(72) Inventors: Yosuke Kanbe, Chita-gun (JP); Soutaro Tabata, Chita-gun (JP); Masahiro Hara, Chita-gun (JP); Toshio Morimoto, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 16/142,730

(22) Filed: Sep. 26, 2018

(65) Prior Publication Data

US 2019/0108429 A1   Apr. 11, 2019

(30) Foreign Application Priority Data

Oct. 6, 2017 (JP) ................................ 2017-195747
Aug. 29, 2018 (JP) ................................ 2018-160048

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01)

(58) Field of Classification Search
CPC ........... G06K 19/06037; G06K 7/1417; G06K 2019/06262
See application file for complete search history.

(56) References Cited

U.S. PATENT DOCUMENTS

| | | | |
|---|---|---|---|
| 4,939,354 A | 7/1990 | Priddy et al. | |
| 5,324,923 A | 6/1994 | Cymbalski et al. | |
| 5,329,107 A | 7/1994 | Priddy et al. | |
| 5,464,974 A | 11/1995 | Priddy et al. | |
| 5,468,953 A | 11/1995 | Priddy et al. | |
| 5,473,151 A | 12/1995 | Priddy et al. | |
| 5,477,045 A | 12/1995 | Priddy et al. | |
| 5,479,004 A | 12/1995 | Priddy et al. | |
| 5,484,999 A | 1/1996 | Priddy et al. | |
| 6,302,329 B1 | 10/2001 | Iwai et al. | |
| 2004/0026511 A1* | 2/2004 | Cheung | G06K 7/1443 235/462.1 |
| 2015/0347886 A1* | 12/2015 | Fang | G06K 19/0614 235/462.04 |
| 2017/0039463 A1* | 2/2017 | Hosokane | G06K 1/12 |

FOREIGN PATENT DOCUMENTS

| | | |
|---|---|---|
| EP | 2921998 A1 | 9/2015 |
| WO | 2016/166914 A1 | 10/2016 |

\* cited by examiner

*Primary Examiner* — Laura A Gudorf
(74) *Attorney, Agent, or Firm* — Oliff PLC

(57) ABSTRACT

A two-dimensional code that is capable of suppressing unnecessary code detection processes related to detection of a code area is provided. Among outer edges of a rectangular code area, a first edge that is composed of a plurality of types of cells arrayed in a single row is configured such that a specific pattern that is composed of an array of two or more differing cells is repeated in at least an intermediate portion. A second edge composed of the plurality of types of cells arrayed in a row such as to oppose the first edge is configured such that the specific pattern is repeated in at least an intermediate portion.

21 Claims, 11 Drawing Sheets

FIG.11A

| SIZE-IDENTIFICATION CELL COUNT | 20 | 22 | 24 |
|---|---|---|---|
| CODE SIZE (VERTICAL × LATERAL) | 15 × 71 | 15 × 43 | 15 × 99 |

FIG.11B

| SIZE-IDENTIFICATION CELL COUNT | 19 | 20 | 21 | 22 | 24 |
|---|---|---|---|---|---|
| CODE SIZE (VERTICAL × LATERAL) | 15 × 71 | | 15 × 43 | | 15 × 99 |

TWO-DIMENSIONAL CODE COMPOSED OF A PLURALITY OF TYPES OF CELLS

CROSS-REFERENCE TO RELATED APPLICATION

This application is based on and claims the benefit of priority from earlier Japanese Patent Applications No. 2017-195747 filed Oct. 6, 2017 and No. 2018-160048 filed Aug. 29, 2018, the descriptions of which are incorporated herein by reference.

BACKGROUND

Technical Field

The present invention relates to a two-dimensional code that is composed of a plurality of types of cells that are arranged in a matrix.

Related Art

A variety of two-dimensional codes that are composed of a plurality of types of cells that are arranged in a matrix are known. A reading apparatus (two-dimensional code reader) that reads this type of two-dimensional code is typically configured in a following manner. That is, upon acquiring image data including the two-dimensional code, the reading apparatus performs an analysis process to detect an area (code area) of the two-dimensional code from within the image data. From the detected code area, the reading apparatus determines the coordinates of each cell based on image content, determines the color of each cell based on image information at each coordinate position, and performs a decoding process. For example, a data matrix disclosed in JP-A-H07-152885 is known as technology related to a two-dimensional code such as this.

When a two-dimensional code that has been imaged is read, the code area of the two-dimensional code occupying the captured image and the coordinates of each cell are required to be accurately detected. However, as in the data matrix disclosed in JP-A-H07-152885, described above, in a configuration in which a rectangular code area is detected using an edge portion in which dark-colored cells are arrayed in an L-shape in a single row, and an edge portion in which light-colored cells and dark-colored cells are alternately arrayed in an L-shape in a single row, the following issue may arise. For example, when the code area is detected from the captured image, even when the data matrix is not imaged, should a solid-line portion that corresponds to a straight-line area in which the dark-colored cells are arrayed in a single row be imaged, the likelihood of the data matrix being imaged is determined to be present and a detection process to detect the code area is performed.

That is, in cases in which a reading target is a two-dimensional code such as that in which the straight-line area in which the dark-colored cells are arrayed in a single row is used as a pattern for code-area detection, an issue occurs in that the detection process for detecting the code area is needlessly performed simply because a straight-line portion that is unrelated to the two-dimensional code is imaged. In addition, even in cases in which the two-dimensional code such as that described above is imaged, should the captured image include an unrelated solid-line portion, the detection process for detecting the code area may be performed with reference to this unrelated solid-line portion. In particular, even in cases in which the solid-line portion is L-shaped, the above-described issue tends to occur because the likelihood that the solid-line portion is formed by an edge portion of a display surface on which the two-dimensional code is displayed, a border of a table provided on the display surface, or the like and included in the captured image is high.

SUMMARY

The present disclosure has been achieved to solve the above-described issues. An object of the present disclosure is to provide a two-dimensional code that is capable of suppressing unnecessary code detection processes in relation to detection of a code area.

To achieve the above-described object, an disclosure according to a first aspect is a two-dimensional code that is composed of a plurality of types of cells arrayed in a matrix within a rectangular code area.

The two-dimensional code is characterized in that, of outer edges of the code area, a first edge composed of the plurality of types of cells arrayed in a single row is configured such that a specific pattern composed of an array of two or more differing cells is repeated in at least an intermediate portion. A second edge composed of the plurality of types of cells arrayed in a single row such as to oppose the first edge is configured such that the specific pattern is repeated in at least the intermediate portion.

In the disclosure according to the first aspect, among the outer edges of the rectangular code area, the first edge that is composed of the plurality of types of cells arrayed in a single row is configured such that the specific pattern composed of an array of two or more differing cells is repeated in at least the intermediate portion. The second edge that is composed by the plurality of types of cells arrayed in a single row such as to oppose the first edge is configured such that the specific pattern is repeated in at least the intermediate portion.

In this manner, in the first edge and the second edge that oppose each other, at least the intermediate portions thereof are configured by the specific pattern being repeated. Therefore, as long as two parallel portions in which the specific pattern is repeated can be detected from a captured image, the code area of which the two parallel portions serve as opposing outer edges can be detected. In particular, a pattern that has periodicity such as the specific pattern being repeated is not easily formed by borders, characters, and the like that are displayed on a display surface together with the two-dimensional code. Unlike solid-line portions, such a pattern is unlikely to be included in the captured image. Therefore, unnecessary code detection processes related to detection of the code area can be suppressed when the code area is not imaged well.

BRIEF DESCRIPTION OF THE DRAWINGS

In the accompanying drawings:

FIG. 11A is an explanatory diagram of a state in which a code size and a size-specification cell count correspond one-to-one; and FIG. 11B is an explanatory diagram of a state in which the code size and the size-specification cell count correspond one-to-many.

DETAILED DESCRIPTION OF THE PREFERRED EMBODIMENTS

First Embodiment

A first embodiment actualizing a two-dimensional code according to the present disclosure will hereinafter be described with reference to the drawings.

First, a configuration of the two-dimensional code according to the present embodiment will be described with reference to FIG. 1.

A two-dimensional code 30 according to the present embodiment is formed by being attached to a carrier medium R, such as paper, by printing, adhesion, or the like. The carrier medium R is further attached to a product by adhesion or the like. In addition, the two-dimensional code 30 can also be electronically displayed on a display screen of a piece of video equipment, a mobile terminal, or the like. In cases in which the two-dimensional code 30 is electronically displayed, the display screen (which is also a background) serves as the carrier medium.

Figure 1:
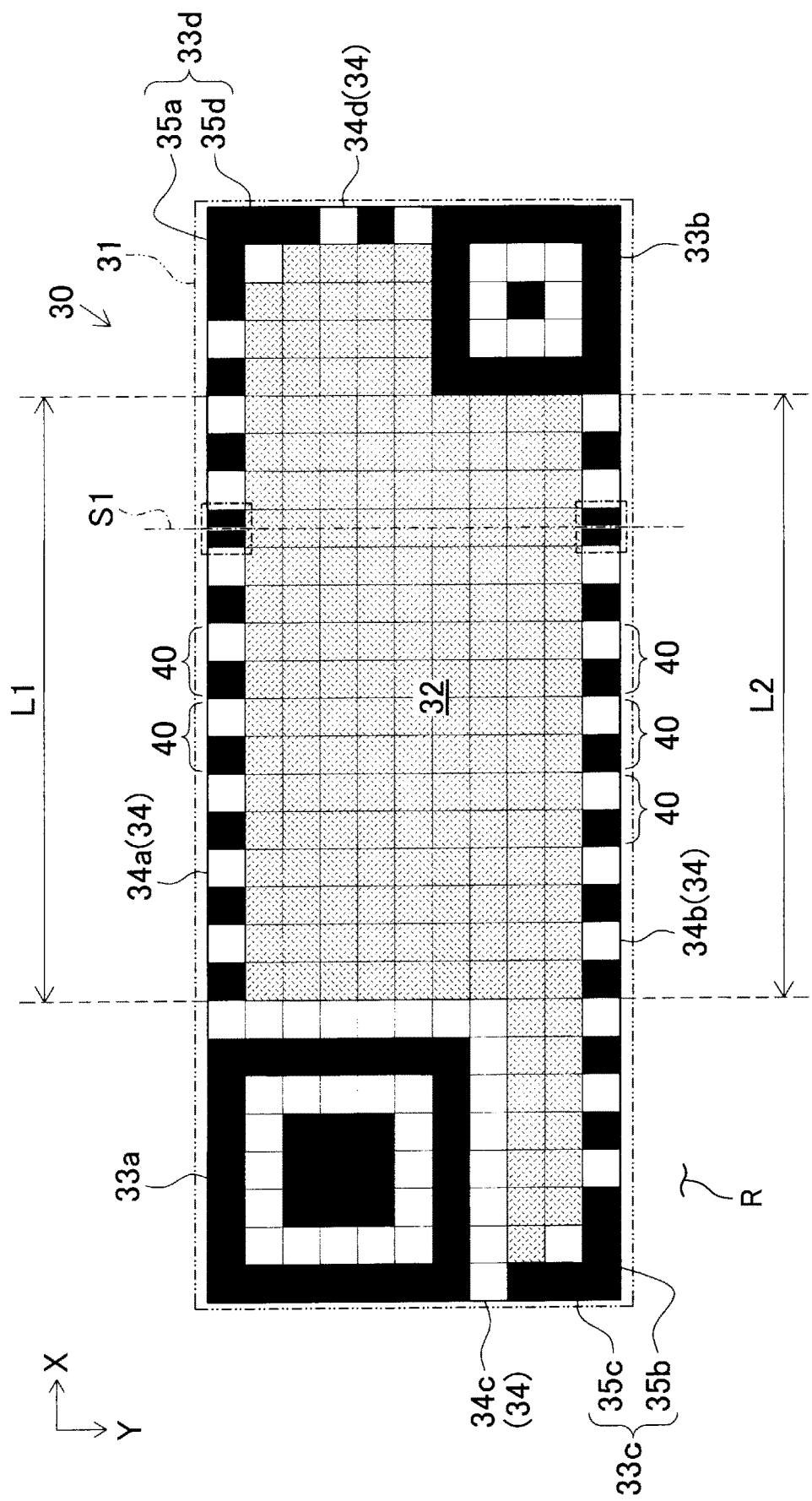
FIG. 1 is an explanatory diagram of a two-dimensional code according to a first embodiment.
Figure 2:
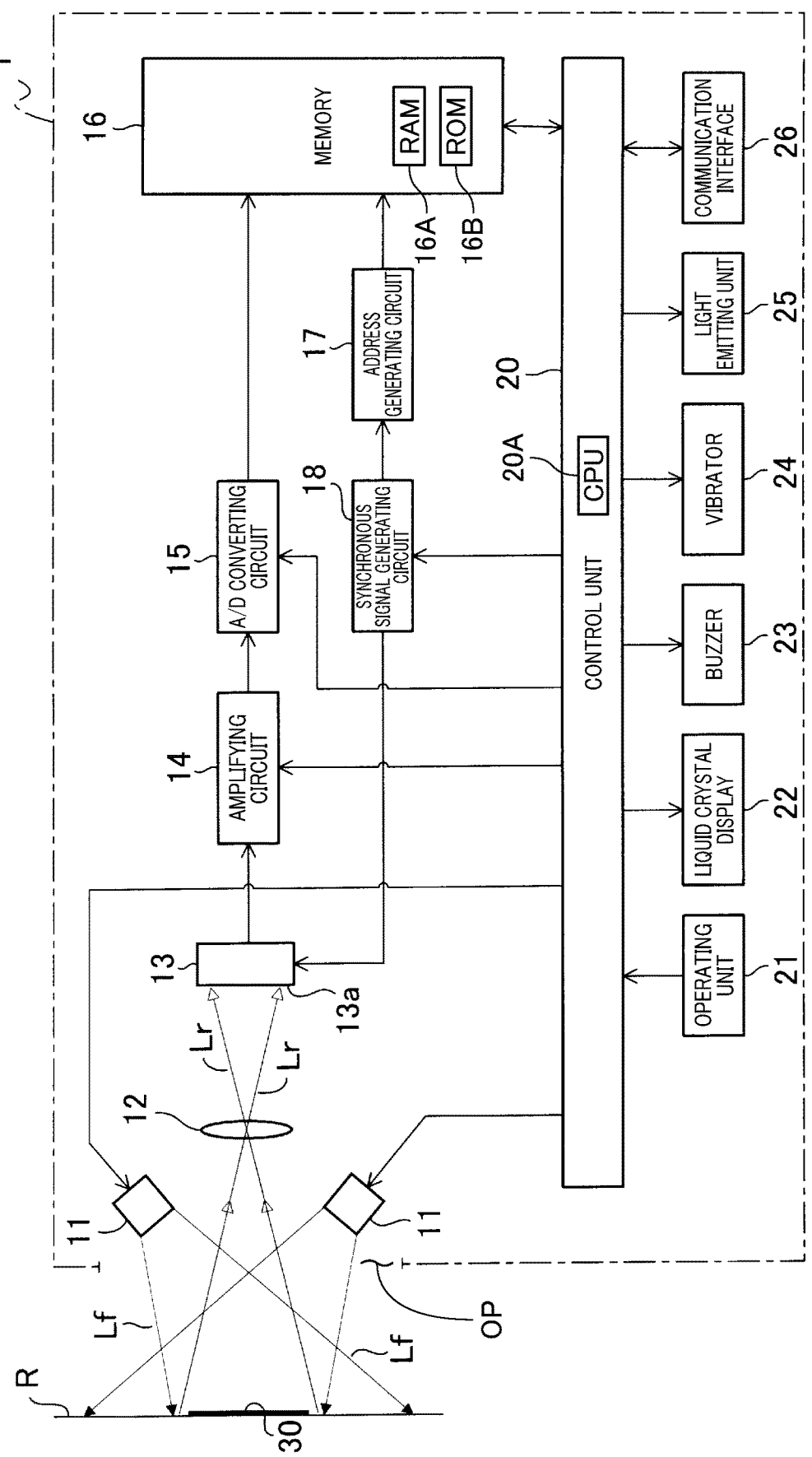
FIG. 2 is a block diagram schematically showing an example of an electrical configuration of an information code reading apparatus that reads the two-dimensional code according to the first embodiment.

As shown in FIG. 1 and FIG. 2, for example, the two-dimensional code 30 is configured by a plurality of types of square-shaped information-display unit cells (also referred to, hereafter, as simply cells) that are arrayed in a matrix within a rectangular code area 31, on the carrier medium R by printing or an electronic screen display method.

As a modification, the two-dimensional code 30 can be formed within a carrier medium which is for example made of a light transmissive material. In such a case, the light may be visible light, infrared light, and/or ultraviolet light.

The code area 31 is divided into a fixed pattern area and a data recording area 32. A pattern that has a shape that is prescribed in advance is arranged in the fixed pattern area. Data is recorded in the data recording area 32 by a plurality of types of cells. As a result, the code area 31 that occupies a captured image can be detected through use of the fixed pattern area. The data recorded in the two-dimensional code 30 is read through use of the data recording area 32 in the detected code area 31. The data recording area 32 can also include an error correction code recording area in which an error correction code is recorded. In FIG. 1 and the like, the data recording area 32 is shaded.

The fixed pattern area is configured by a first position detection pattern 33a, a second position detection pattern 33b, and outer edges 34 of the code area 31 that excludes the first position detection pattern 33a and the second position detection pattern 33b. The first position detection pattern 33a is arranged in one corner portion of the code area 31. The second position detection pattern 33b is arranged in a corner portion of the code area 31 that is diagonal to the first position detection pattern 33a According to the present embodiment, as shown in FIG. 1, the two-dimensional code 30 is configured by two types of cells, that is, dark-colored cells and light-colored cells being arrayed in a matrix. The first position detection pattern 33a is configured by nine dark-colored cells that are arrayed in the center in the shape of a square, a light-colored cell group that surrounds the nine dark-colored cells in a single row, a dark-colored cell group that surrounds the light-colored cell group in a single row, and an L-shaped light-colored group that separates the dark-colored cell group from the data recording area 32. Therefore, the first position detection pattern 33a can be detected based on an area in which the dark-colored cells and the light-colored cells have a continuation ratio of 1:1:3:1:1 in order from dark, light, dark, light, to dark, in a manner similar to a position detection pattern of a QR code (registered trademark).

In addition, the second position detection pattern 33b is configured by a single dark-colored cell in the center, a light-colored cell group that surrounds the dark-colored cell in a single row, and a dark-colored cell group that surrounds the light-colored cell group in a single row. Therefore, the second position detection pattern 33b can be detected based on an area in which the dark-colored cells and the light-colored cells have a continuation ratio of 1:1:1:1:1 in order from dark, light, dark, light, to dark.

The outer edges 34 of the code area 31 are configured by the cells being arrayed in a single row. The outer edges 34 are composed of a first edge 34a, a second edge 34b, a third edge 34c, and a fourth edge 34d. The first edge 34a configures a long side on the first position detection pattern 33a side. The second edge 34b configures a long side on the second position detection pattern 33b side. The third edge 34c configures a short side on the first position detection pattern 33a side. The fourth edge 34b configures a short side on the second position detection pattern 33b side.

The first edge portion 34a is configured such that one end portion is connected to the first position detection pattern 33a, and the other end portion is composed of three dark-colored cells that serve as an end-portion pattern 35a. In the portion of the first edge 34a excluding the end-portion pattern 35a, the light-colored cells and the dark-colored cells are alternately arrayed. That is, the first edge 34a is configured such that, in at least the intermediate portion (i.e., partial edge), a specific pattern 40 configured by an array of a set of light-colored and dark-colored cells is repeated until the first position detection pattern 33a is reached.

The second edge 34b is configured such that one end portion is composed of three dark-colored cells that serve as an end-portion pattern 35b and the other end portion is connected to the second position detection pattern 33b. In the portion of the second edge 34b excluding the end-portion pattern 35b, the light-colored cells and the dark-colored cells are alternately arrayed. That is, the second edge 34b is configured such that, in at least the intermediate portion (partial edge), the specific pattern 40 is repeated until the second position detection pattern 33b is reached. The specific pattern 40 has a configuration similar to that of the first edge 34a.

In particular, regarding the portion of the first edge 34a in which the specific pattern 40 is repeated (see L1 in FIG. 1) and the portion of the second edge 34b in which the specific pattern 40 is repeated (see L2 in FIG. 1), the second edge 34b is configured such that the cells in the positions opposing the cells of the first edge 34a in an opposing direction (Y direction in FIG. 1) are of the same type as the cells of the first edge 34a. The opposing direction is orthogonal to the first edge 34a and the second edge 34b. Therefore, for example, the cell in the first edge 34a and the cell in the second edge 34b through which a single-dot chain line S1 that extends in the opposing direction in FIG. 1 passes are both dark-colored cells.

The third edge 34c is configured such that one end portion is connected to the first position detection pattern 33a, and the other end portion is composed of dark-colored cells, in the same manner as the end-portion pattern 35b of the second edge 34b, to serve as an end-portion pattern 35c. The intermediate portion (partial edge) between the one end portion and the other end portion is configured such that the specific pattern 40 is repeated. The end-portion pattern 35c is connected to the end-portion pattern 35b of the second edge 34b in an L-shape. The end-portion pattern 35c and the end-portion pattern 35b thereby configures a corner pattern 33c together with a single light-colored cell between the end-portion pattern 35c and the end-portion pattern 35b.

The fourth edge 34d is configured such that one end portion is composed of dark-colored cells, in the same manner as the end-portion pattern 35a of the first edge 34a, to serve as an end-portion pattern 35d, and the other end portion is connected to the second position detection pattern 33b. The intermediate portion (partial edge) between the one end portion and the other end portion is configured such that the specific pattern 40 is repeated. The end-portion pattern 35d is connected to the end-portion pattern 35a of the first edge 34a in an L-shape. The end-portion pattern 35d and the end-portion pattern 35a thereby configures a corner pattern 33d together with a single light-colored cell between the end-portion pattern 35d and the end-portion pattern 35a.

In the two-dimensional code 30 configured as described above, the first edge 34a and the second edge 34b that oppose each other are configured such that at least the intermediate portions (partial edges) thereof are composed of the repeated specific pattern 40. Therefore, should two parallel portions in which the specific pattern 40 is repeated be detected from the captured image, the code area 31 of which the two parallel portions serve as opposing outer edges can be detected. In particular, the likelihood of a pattern that has periodicity, such as that in which the above-described specific pattern 40 is repeated, being included in a captured image is low, unless such a pattern is intentionally placed in the captured image.

Next, an information code reading apparatus (or information code reader) 1 will be described with reference to FIG. 2. The information code reading apparatus 1 functions as a two-dimensional code reading apparatus that is capable of optically reading the two-dimensional code 30 according to the present embodiment.

The information code reading apparatus 1 according to the present embodiment is a portable reading apparatus that optically reads the two-dimensional code 30, a bar code, or the like. As shown in FIG. 2, the information code reading apparatus 1 is configured such that a circuit section is housed inside a case (not shown). The circuit section mainly includes an optical system and a microcomputer system circuit CP. The optical system includes an illumination light source 11, a light receiving sensor 13, an image forming lens 12, and the like. The microcomputer system circuit CP includes a memory 16, a control unit 20, and the like. The information code reading apparatus 1 is not limited to the portable type and may be configured as a stationary reading apparatus.

The optical system is divided into a light-projecting optical system and a light-receiving optical system. The illumination light source 11 that configures the light-projecting optical system functions as an illumination light source that is capable of emitting an illumination light Lf. For example, the illumination light source 11 is configured by a red-colored light-emitting diode (LED) and a lens that is provided on an emission side of the LED. FIG. 2 conceptually shows an example in which the illumination light Lf is irradiated towards a reading target R on which the two-dimensional code 30 is attached.

The light-receiving optical system is configured by the light receiving sensor 13, the image forming lens 12, a reflective mirror (not shown), and the like. For example, the light receiving sensor 13 is configured as an area sensor in which light receiving elements are arrayed in a two-dimensional manner. Here, the light receiving element is a solid-state image sensor, such as a complementary metal-oxide semiconductor (CMOS) or a charge-coupled device (CCD). The light receiving sensor 13 is configured to output an electrical signal based on the strength of reflected light Lr for each cell (pattern) of an information code from which light is received. The light receiving sensor 13 is mounted on a printed circuit board (not shown) such as to be capable of receiving incident light that enters through the image forming lens 12.

The image forming lens 12 functions as an image-forming optical system that is capable of collecting incident light that enters through a reading opening (not shown) from outside, and forming an image on a light receiving surface 13a of the light receiving sensor 13. According to the present embodiment, after the illumination light Lf that has been irradiated from the illumination light source 22 or the like is reflected by the information code or the like, the image forming lens 12 collects the reflected light Lr and forms a code image on the light receiving surface 13a of the light receiving sensor 13.

The microcomputer system circuit CP includes an amplifying circuit 14, an analog-to-digital (A/D) converting circuit 15, the memory 16, an address generating circuit, a synchronous signal generating circuit 18, the control unit 20, an operating unit 21, a liquid crystal display 22, a buzzer 23, a vibrator 24, a light emitting unit 25, and a communication interface 26. The microcomputer system circuit CP is mainly configured by the control unit 20 and the memory 16. The control unit 20 includes a central processing unit (CPU) 20A and is capable of functioning as a microcomputer (information processing unit). The microcomputer system circuit CP is capable of performing signal processing by hardware and software on an image signal of the information code including the two-dimensional code 30 imaged by the above-described optical system. In addition, the control unit 20 also carries out control related to the overall system of the information code reading apparatus 1.

The image signal (analog signal) outputted from the light receiving sensor 13 of the optical system is inputted to the amplifying circuit 14 and thereby amplified by a predetermined gain. Then, the image signal is inputted to the A/D converting circuit 15 and converted from an analog signal to a digital signal. The digitalized image signal, that is, the image data (image information) is inputted to the memory 16 and collected in an image-data collection area. The synchronous signal generating circuit 18 is configured to be capable of generating a synchronous signal for the light receiving sensor 13 and the address generating circuit 17. In addition, the address generating circuit 17 is capable of generating a storage address of the image data stored in the memory 16 based on the synchronous signal provided by the synchronous signal generating circuit 18.

The memory 16 is a semiconductor memory device. For example, a random access memory (RAM) 16A [dynamic random access memory (DRAM) or synchronous dynamic random access memory (SDRAM)] and a read-only memory (ROM) 16B [erasable programmable read-only memory (EPROM) or electrically erasable programmable read-only memory (EEPROM)] correspond to the memory 16. In the RAM 16A of the memory 16, in addition to the above-described image data collection area, a work area and a reading condition table used by the control unit 20 during processes such as arithmetic operations and logical operations can be secured. In addition, in the ROM 16B, system programs and the like that enable control of hardware such as the illumination light source 11 and the light receiving sensor 13 are stored in advance. Furthermore, in the memory 16, information (also referred to, hereafter, as specific pattern information and the like) related to fixed pattern areas of the two-dimensional code 30 to be read, such as the specific pattern 40 configuring the first edge 34a and second edge 34b, the end-portion patterns, the position detection patterns 33a and 33b, and the corner patterns 33c and 33d, a program used to perform a reading process to optically read the two-dimensional code 30 using the specific pattern information and the like, and the like are stored.

The control unit 20 is a microcomputer unit that is capable of controlling the overall information code reading apparatus 1. The control unit 20 includes the CPU 20A, a system bus, and an input/output interface. The control unit 20 is capable of configuring an information processing unit together with the memory 16 and provides an information processing function. The control unit 20 is capable of connecting to various input/output apparatuses (peripheral apparatuses) via the input/output interface provided therein. According to the present embodiment, the operating unit 21, the liquid crystal display 22, the buzzer 23, the vibrator 24, the light emitting unit 25, the communication interface 26, and the like are connected to the control unit 20.

The operating unit 21 is configured by a plurality of keys. The operating unit 21 provides the control unit 20 with an operating signal based on a key operation by a user. When the operating signal is received from the operating unit 21, the control unit 20 performs an operation based on the operating signal. The liquid crystal display 22 is configured by a publicly known liquid-crystal display panel. The control unit 20 controls the display content of the liquid crystal display 22. The buzzer 23 is configured by a publicly known buzzer. The buzzer 23 generates a predetermined sound based on an operation signal from the control unit 20. The vibrator 24 is configured by a publicly known vibrator that is mounted in portable apparatuses. The vibrator 24 generates a vibration based on a drive signal from the control unit 20. For example, the light emitting unit 25 is an LED. The light emitting unit 25 is illuminated based on a signal from the control unit 20. The communication interface 26 is configured as an interface for performing data communication with an outside apparatus (such as a host apparatus). The communication interface 26 performs a communication process in cooperation with the control unit 20.

Figure 3:
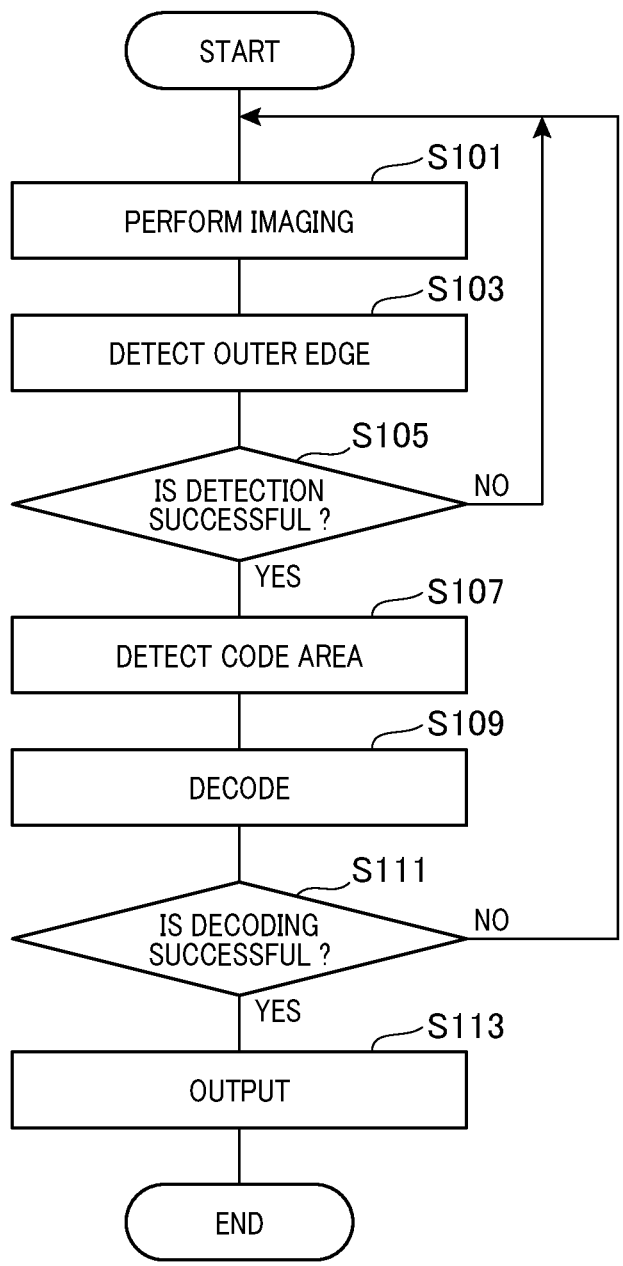
FIG. 3 is a flowchart of an example of the flow of a reading process performed by a control unit of the information code reading apparatus.

Next, the reading process that is performed by the control unit 20 (specifically, the CPU 20A) of the information code reading apparatus 1 when reading the two-dimensional code 30 will be described with reference to the flowchart in FIG. 3.

When a predetermined operation is performed on the operating unit 21 in a state in which a reading opening OP of the information code reading apparatus 1 is placed facing the two-dimensional code 30, the reading process by the control unit 20 is started. First, the control unit 20 performs an imaging process indicated at step S101. The control unit 20 generates the image data of a captured image including the two-dimensional code 30 based on the signal outputted from the light receiving sensor 13 that has received the reflected light Lr from the two-dimensional code 30.

Next, the control unit 20 performs an outer edge detection process indicated at step S103. In this process, the control unit 20 performs a process to detect the two parallel portions in which the specific pattern 40 is repeated, that is, the first edge 34a and the second edge 34b from the captured image that has been imaged as described above, based on the specific pattern information and the like stored in the memory 16 in advance. In this process, the control unit 20 may directly detect the first edge 34a and the second edge 34b from the captured image using the above-described specific pattern 40, the end-portion patterns 35a and 35b, and the like. Alternatively, the control unit 20 may detect the first edge 34a and the second edge 34b based on the positions of the position detection patterns 33a and 33b, and the corner patterns 33c and 33d detected from the captured image.

When the first edge 34a and the second edge 34b are detected from the captured image that has been imaged, as a result of the two-dimensional code 30 being imaged (Yes at S105), the control unit 20 performs a code area detection process indicated at step S107. In this process, the control unit 20 detects the code area 31 based on the first edge 34a and the second edge 34b detected as described above, the first position detection pattern 33a, the second position detection pattern 33b, and the like.

Then, the control unit 20 performs a decoding process indicated at step S109. The control 20 performs a process to decode predetermined data recorded in the data recording area 32 based on the array of cells inside the code area 31 that has been detected as described above. When the decoding process is successful (Yes at S111), the control unit 20 performs a process to output the predetermined data acquired through the decoding process to the outside (S113). The control unit 20 then ends the reading process. Meanwhile, when the decoding process has failed (No at step S111), the control unit 20 determines that the two-dimensional code 30 has not been imaged in a decodable manner and performs the process from step S101.

In addition, when the first edge 34a and the second edge 34b are not detected from the captured image that has been imaged (No at S105), the control unit 20 determines that the two-dimensional code 30 is not imaged. The control unit 20 performs the process from step S101 without performing the code area detection process (S107) for detecting the code area 31.

As described above, in the two-dimensional code 30 according to the present embodiment, among the outer edges 34 of the rectangular code area 31, the first edge 34a that is composed of a plurality of types of cells arrayed in a single row is configured such that the specific pattern 40 that is composed of an array of two or more differing cells is repeated in at least the intermediate portion. The second edge 34b that is composed of a plurality of types of cells arrayed in a single row such as to oppose the first edge 34a is configured such that the specific pattern 40 is repeated in at least the intermediate portion.

In this manner, in the first edge 34a and the second edge 34b that oppose each other, at least the intermediate portions thereof are configured by the same specific pattern 40 being repeated. Therefore, as long as the two parallel portions in which the specific pattern 40 is repeated can be detected from the captured image, the code area 31 of which the two parallel portions serve as the opposing first edge 34a and the second edge 34b of the outer edges 34 can be detected. In particular, a pattern that has periodicity such as the specific pattern 40 being repeated is not easily formed by borders, characters, and the like that are displayed on a display surface together with the two-dimensional code 30. Unlike solid-line portions, such a pattern is unlikely to be included in the captured image. Therefore, unnecessary code detection processes related to detection of the code area 31 can be suppressed when the code area 31 is not imaged. As a result, processing time related to the reading process in the information code reading apparatus 1 can be shortened.

In addition, the first position detection pattern 33a that is used to detect the code area 31 is arranged in one corner portion of the code area 31. The first edge 34a is configured such that the specific pattern 40 is repeated until the first position detection pattern 33a is reached. Therefore, when the first edge 34a is detected with reference to the detected first position detection pattern 33a, the detection process can be facilitated.

In addition, the second position detection pattern 33b that is used to detect the code area 31 is arranged in a corner portion of the code area 31 diagonal to the first position detection pattern 33a. The second position detection pattern 33b has an array that differs from that of the first position detection pattern 33a. The second edge 34b is configured such that the specific pattern 40 is repeated until the second position detection pattern 33b is reached. Therefore, when the second edge 34b is detected with reference to the detected second position detection pattern 33b, the detection process can be facilitated. Furthermore, when either of the first position detection pattern 33a and the second position detection pattern 33b is detected, the position of the detected first position detection pattern 33a or second position detection pattern 33b can be used as reference to find the other of the first position detection pattern 33a and the second position detection pattern 33b. As a result, the positions of two corners of the code area 31 that are diagonally opposite to each other can be detected. The outer shape of the code area 31 can be easily detected.

Figure 4:
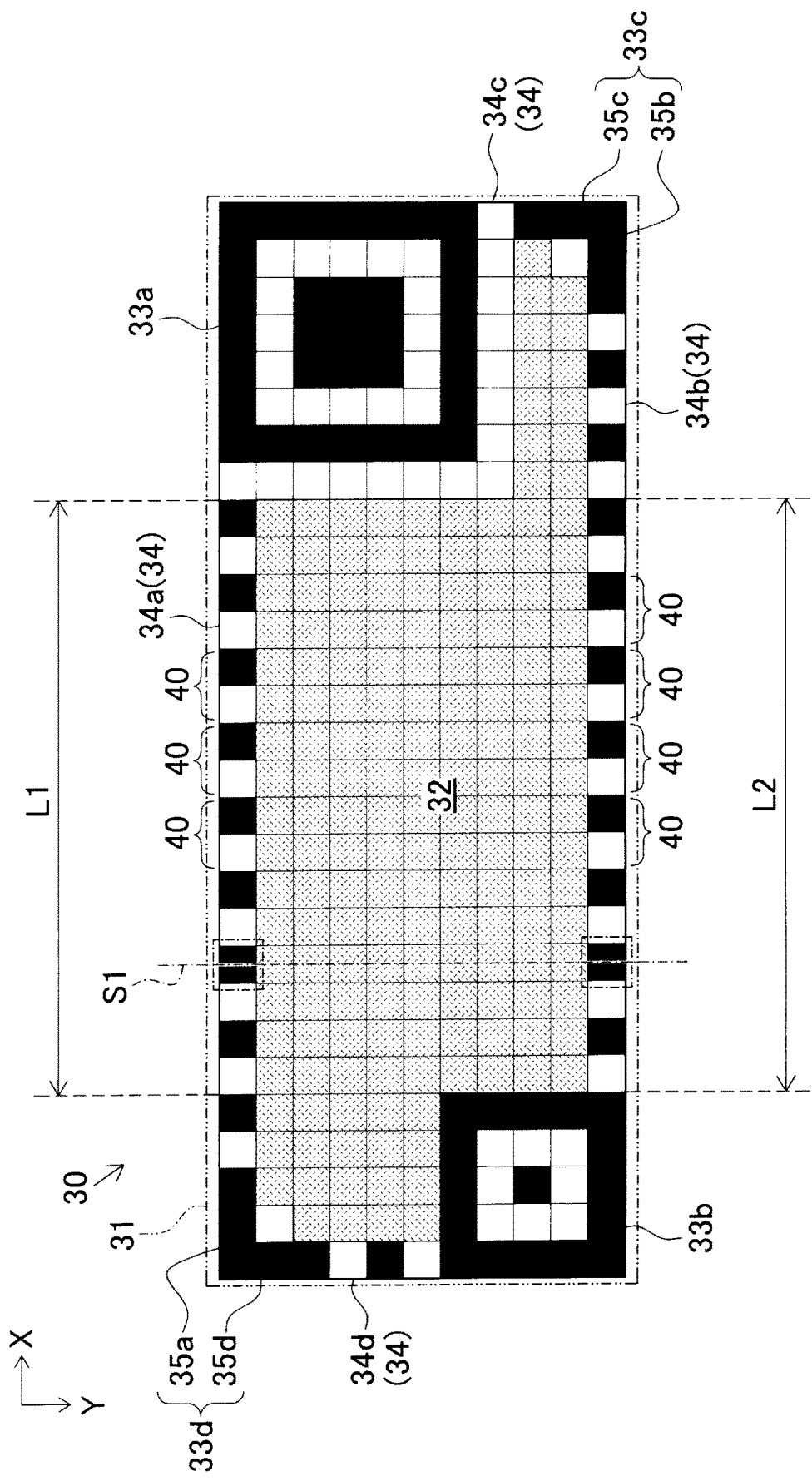
FIG. 4 is an explanatory diagram of a state in which the two-dimensional code in FIG. 1 is flipped front-to-back.

In particular, the array differs between the first position detection pattern 33a and the second position detection pattern 33b. Therefore, whether or not the code area 31 is imaged in a state in which the two-dimensional code 30 is flipped front-to-back can be easily determined based on the positional relationships between the first position detection pattern 33a and the second position detection pattern 33b, and the first edge 34a and the second edge 34b. As a result, rather than two processes, that is, a process for decoding the two-dimensional code 30 in the state in which the two-dimensional code 30 is flipped front-to-back (see FIG. 4) and a process for decoding the two-dimensional code 30 in the state in which the two-dimensional code 30 is not flipped front-to-back (see FIG. 1) being performed, only either of the two processes need be performed. Therefore, processing time related to the reading process for reading the two-dimensional code 30 can be shortened.

Furthermore, the first edge 34a is configured such that the end portion on the side opposite the first position detection pattern 33a serves as the end-portion pattern 35a that differs from the specific pattern 40. Therefore, the end portion of the first edge 34a, that is, the fourth edge 34d that serves as the outer edge of the code area 31 orthogonal to the first edge 34a can be easily detected with reference to the end-portion pattern 35a.

In addition, the second edge 34b is configured such that the end portion on the side opposite the second position detection pattern 33b serves as the end-portion pattern 35b that differs from the specific pattern 40. Therefore, the end portion of the second edge 34b, that is, the third edge 34c that serves as the outer edge of the code area 31 orthogonal to the second edge 34b can be easily detected with reference to the end-portion pattern 35b.

In particular, in the portion of the first edge 34a in which the specific pattern 40 is repeated (see L1 in FIG. 1) and the portion of the second edge 34b in which the specific pattern 40 is repeated (see L2 in FIG. 1), the cells in the opposing positions in the opposing direction (Y direction in FIG. 1) orthogonal to the first edge 34a and the second edge 34b are of the same type (see S1 in FIG. 1). Therefore, the cell coordinates of each cell in relation to the opposing direction can be more easily accurately determined with reference to the specific patterns 40. The success rate of decoding can be improved.

In addition, the specific pattern 40 is composed of a set of light-colored and dark-colored cells. Therefore, while the first edge 34a and the second edge 34b are configured such as to have a pattern that has periodicity such as that in which the light-colored cells and the dark-colored cells are alternately repeated, the first edge 34a and the second edge 34b are not easily formed by borders, characters, and the like that are displayed on a display surface together with the two-dimensional code 30. Unlike solid-line portions, the first edge 34a and the second edge 34b are unlikely to be included in the captured image. Therefore, unnecessary code detection processes related to detection of the code area 31 can be suppressed when the code area 31 is not imaged.

Figure 5:
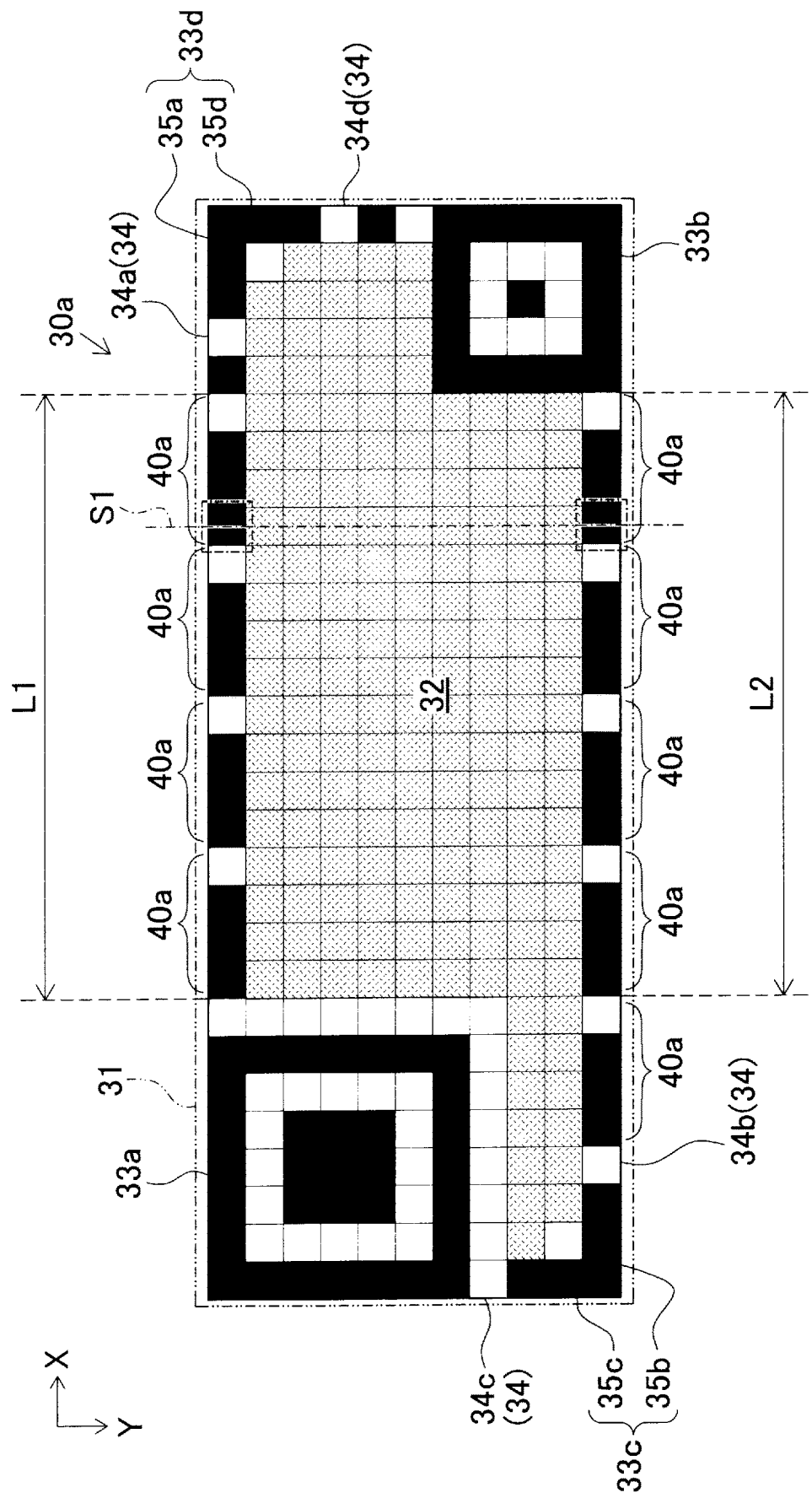
FIG. 5 is an explanatory diagram of a two-dimensional code in a first variation example according to the first embodiment.

Here, the specific pattern 40 is not limited to being configured by a set of light-colored and dark-colored cells. The specific pattern 40 may be configured by other cell combinations such that the outer edge has periodicity as a result of the specific pattern 40 being continued. For example, as a first variation example according to the present embodiment, the specific pattern may be configured by a single light-colored cell and three dark-colored cells as in a specific pattern 40a in a two-dimensional code 30a shown as an example in FIG. 5.

In addition, the first edge 34a and the second edge 34b are configured to form the long sides of the rectangular code area 31. Therefore, compared to a configuration in which the first edge 34a and the second edge 34b form the short sides of the code area 31, a repeat-appearance frequency of the specific pattern 40 increases. Therefore, the first edge 34a and the second edge 34b can be easily detected.

Depending on the environment and the like in which the two-dimensional code 30 is used, the code area 31 may be configured to have a square shape. Alternatively, the code area 31 may be configured such that the first edge 34a and the second edge 34b that are configured by the specific pattern 40 being repeated form the short sides.

In addition, the fixed pattern area is not limited to being configured to include both of the two position detection patterns, that is, the first position detection pattern 33a and the second position detection pattern 33b. The fixed pattern area may be configured to include either of the first position detection pattern 33a and the second position detection pattern 33b. In addition, the two position detection patterns, that is, the first position detection pattern 33a and the second position detection pattern 33b may be omitted. In this case, as a second variation example according to the present embodiment, the first edge 34a is configured such that a starting end and a tail end are composed of end-portion patterns (such as a pattern composed of three dark-colored cells) that differ from the specific pattern 40, as in the end-portion patterns 35a and 36b shown as an example in FIG. 6. As a result, both end portions of the first edge 34a, that is, the third edge 34c and the fourth edge 34d that serve as the outer edges of the code area 31 orthogonal to the first edge 34a can be easily detected with reference to the end-portion patterns 35a and 36a. In a similar manner, the second edge 34b is configured such that a starting end and a tail end are composed of end-portion patterns that differ from the specific pattern 40, as in the end-portion patterns 35b and 36b shown as an example in FIG. 6. As a result, both end portions of the second edge 34b, that is, the third edge 34c and the fourth edge 34d that serve as the outer edges of the code area 31 orthogonal to the second edge 34b can be easily detected with reference to the end-portion patterns 35b and 36b.

Figure 6:
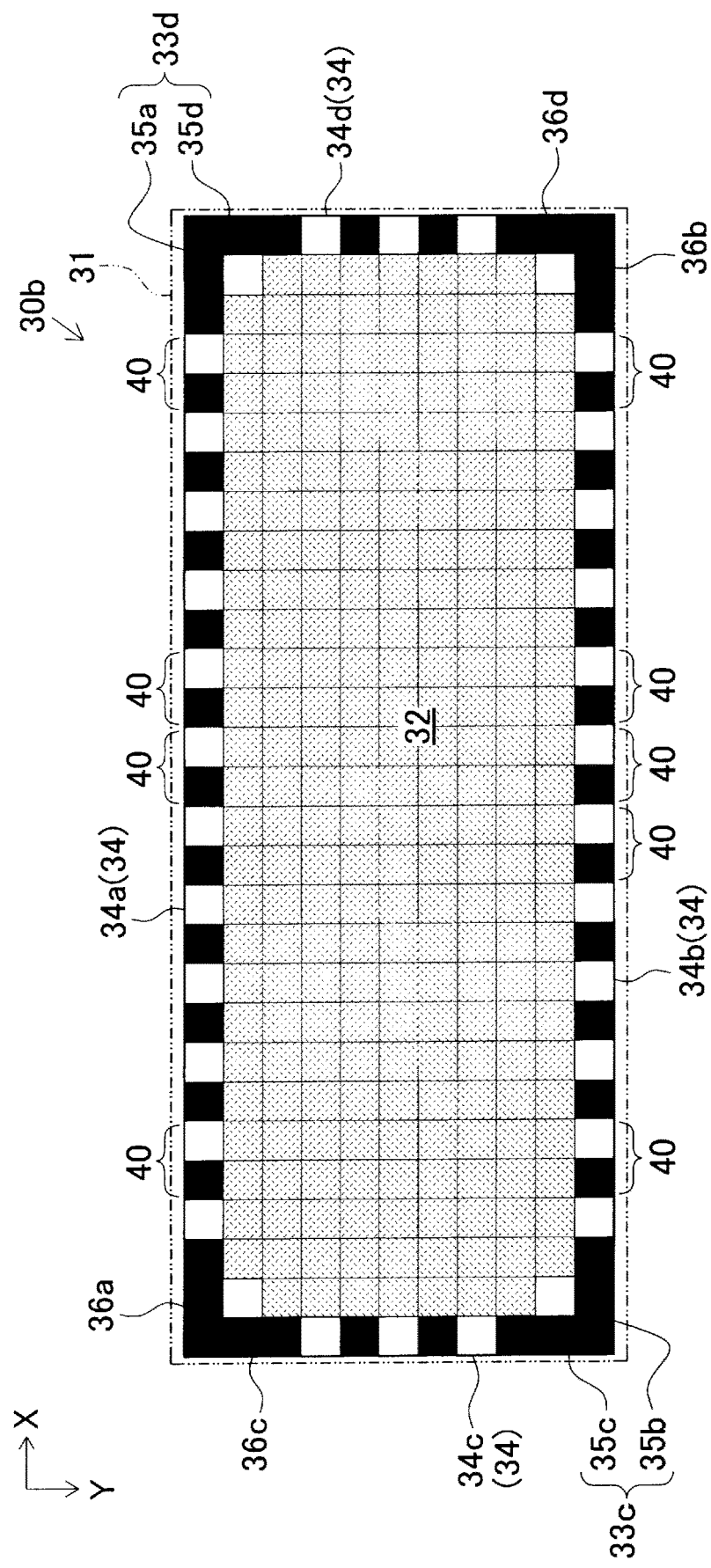
FIG. 6 is an explanatory diagram of a two-dimensional code in a second variation example according to the first embodiment.

In addition, as shown as an example in FIG. 6, the first edge 34a and the third edge 34c can be detected through use of a corner pattern that is configured by the end-portion pattern 36a of the first edge 34a, an end-portion pattern 36c of the third edge 34c, and a light-colored cell between the end-portion pattern 36a and the end-portion pattern 36c. Furthermore, the second edge 34b and the fourth edge 34d can be detected through use of a corner pattern that is configured by the end-portion pattern 36b of the second edge 34b, an end-portion pattern 36d of the fourth edge 34d, and a light-colored cell between the end-portion pattern 36b and the end-portion pattern 36d.

Second Embodiment

Next, a two-dimensional code according to a second embodiment will be described with reference to FIG. 7.

The second embodiment mainly differs from the above-described first embodiment in that a partition pattern that partitions the data recording area 32 in the opposing direction is newly arranged in the code area 31 as a part of the fixed pattern area.

Therefore, constituent sections that are substantially identical to those of the two-dimensional code according to the first embodiment are given the same reference numbers. Descriptions thereof are omitted.

Figure 7:
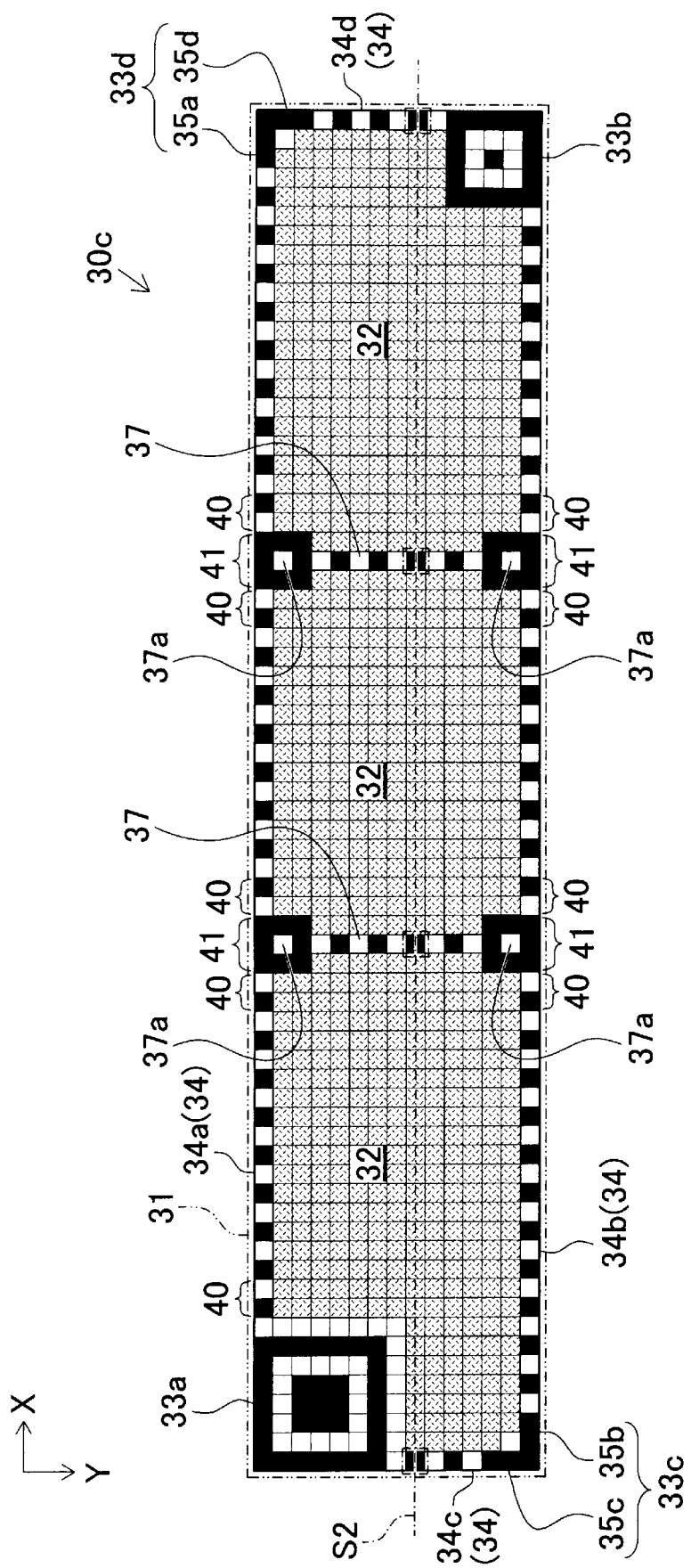
FIG. 7 is an explanatory diagram of a two-dimensional code according to a second embodiment.

As shown in FIG. 7, the first edge 34a and the second edge 34b of a two-dimensional code 30c according to the present embodiment are each configured such that two second specific patterns 41 appear during the repetition of the specific pattern 40. The second specific pattern 41 has an array that differs from that of the specific pattern 40. For example, the second specific pattern 41 is composed of three dark-colored cells such as to disrupt the periodicity that is produced through the use of the specific pattern 40. The cells of the second specific pattern 41 in the first edge 34a and the cells of the second specific pattern 41 in the second edge 34a that are in opposing positions in the opposing direction are of the same type.

A partition pattern 37 is arranged such as extend from the dark-colored cell in the center of the second specific pattern 41 in the first edge 34a to the opposing dark-colored cell in the center of the second specific pattern 41 in the second edge 34b. The partition patterns 37 have the same cell array.

The partition pattern 37 is configured such that the dark-colored cells and the light-colored cells are alternately arrayed in a single row, in a manner similar to the first edge 34a and the second edge 34b. A cell 37a in the end portion of the partition pattern 37 that is in contact with the dark-colored cell in the center of the second specific pattern 41 is the light-colored cell that differs in type from the cells configuring the second specific pattern 41.

As a result, the partition pattern 37 can function as an alignment pattern and be used for distortion correction of the cell coordinates. In particular, according to the present embodiment, cells adjacent to the cell 37a in the end portion of the partition pattern 37 are also included in the fixed pattern area. The cells surrounding the cell 37a in the end portion are configured by cells (dark-colored cells) of the same type as the cells configuring the second specific pattern 41.

The third edge 34c and the fourth edge 34d are each configured such that the cells configuring at least the intermediate portion are of the same type as the cells in the partition pattern 37 at opposing positions in a direction (X direction in FIG. 7) along the first edge 34a and the second edge 34b. Therefore, for example, regarding the type of the cells through which a single-dot chain line S2 that extends in the X direction in FIG. 7 pass, the cell in the third edge 34c, the cell in the fourth edge 34c, and the cells in the partition patterns 37 are all dark-colored cells.

As described above, in the two-dimensional code 30c according to the present embodiment, the first edge 34a and the second edge 34b are each configured such that two second specific patterns 41 appear during the repetition of the specific pattern 40. The second specific pattern 41 has an array that differs from that of the specific pattern 40. The cells in the second specific pattern 41 in the first edge 34a and the cells in the second specific pattern 41 in the second edge 34b in opposing positions in the opposing direction are of the same type. Therefore, the cell coordinates of each cell in relation to the opposing direction can be easily accurately determined with reference to the second specific patterns 41, in addition to the specific patterns 40. The success rate of decoding can be further improved.

The first edge 34a and the second edge 34b are each configured such that two second specific patterns 41 appear. The partition pattern 37 is arranged such as to extend from the second specific pattern 41 in the first edge 34a to the opposing second specific pattern 41 in the second edge 34b. The partition patterns 37 have the same cell array. Therefore, the cell coordinates of each cell in relation to the opposing direction (Y direction in FIG. 7) can be determined with reference to the specific patterns 40 and the second specific patterns 41. The cell coordinates of each cell in relation to the direction (X direction in FIG. 7) along the first edge 34a and the second edge 34b can be determined with reference to the partition patterns 37. The success rate of decoding can be still further improved.

In particular, the second specific pattern 41 is configured by three dark-colored cells being arrayed. The partition pattern 37 is configured such that the cell 37a in the end portion that is in contact with the dark-colored cell in the center of the second specific pattern 41 is the light-colored cell that differs in type from the cells configuring the second specific pattern 41. The cells surrounding the cell 37a in the end portion are configured by the dark-colored cells of the same type as the cells configuring the second specific pattern 41. Therefore, in addition to the cell 37a in the end portion of the partition pattern 37 being surrounded by cells of a differing type, the cells surrounding the cell 37a in the end portion of the partition pattern 37 are all of the same type. As a result, the cell 37a in the end portion of the partition pattern 37 can be easily detected. Consequently, the partition patterns 37 and the second specific patterns 41 can be easily detected.

Furthermore, the third edge 34c and the fourth edge 34d are each configured such that the cells that configure at least the intermediate portion are of the same type as the cells in the partition pattern 37 in opposing positions in the direction (X direction in FIG. 7) along the first edge 34a and the second edge 34b. Therefore, the cell coordinates of each cell in relation to the direction along the first edge 34a and the second edge 34b can be easily accurately determined with reference to the intermediate portions of the third edge 34c and the fourth edge 34d, in addition to the partition patterns 37. The success rate of decoding can be further improved.

Figure 8:
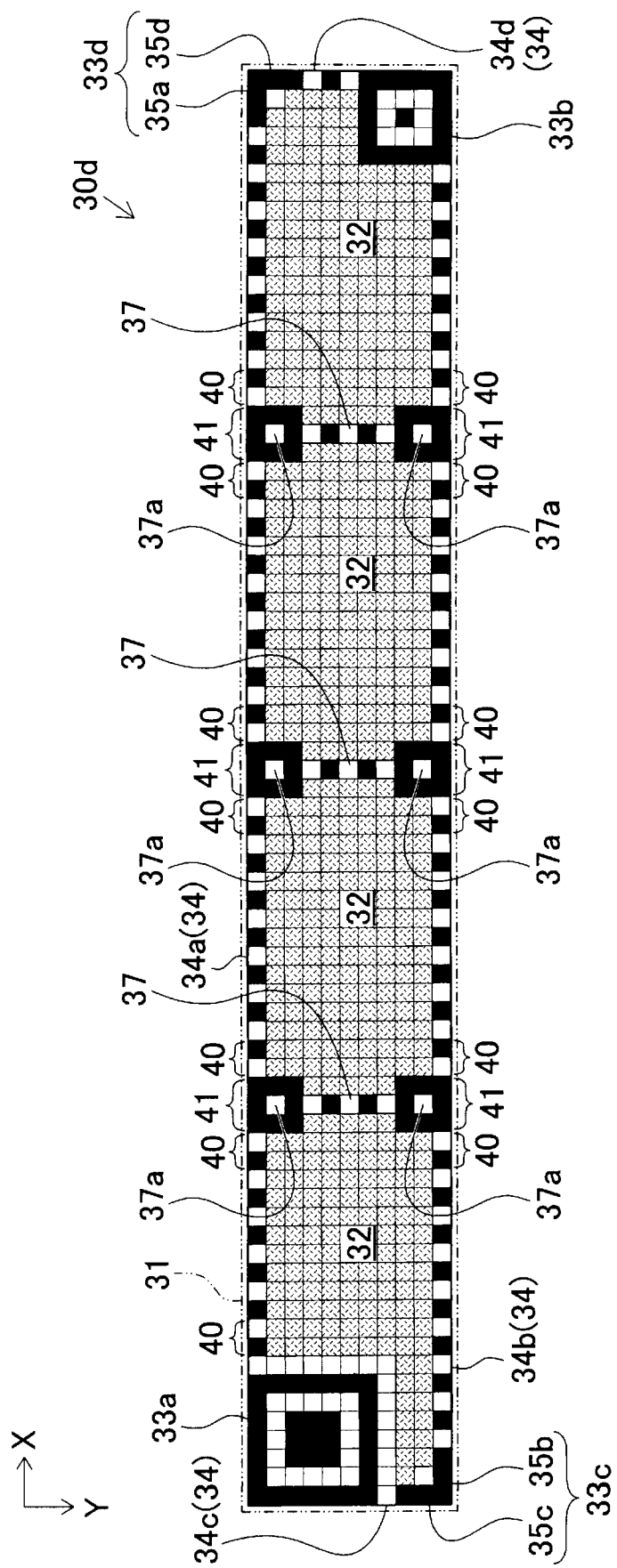
FIG. 8 is an explanatory diagram of a two-dimensional code in a first variation example according to the second embodiment.

The first edge 34a and the second edge 34b are not limited to being configured such that two second specific patterns 41 appear during the repetition of the specific pattern 40. The first edge 34a and the second edge 34b may each be configured such that a single second specific pattern 41 appears during the repetition of the specific pattern 40. Alternatively, the first edge 34a and the second edge 34b may each be configured such that three or more second specific patterns 41 appear during the repetition of the specific pattern 40. For example, as a first variation example according to the present embodiment, as in a two-dimensional code 30d shown as an example in FIG. 8, the first edge 34a and the second edge 34b may each be configured such that three second specific patterns 41 appear during the repetition of the specific pattern 40. As shown in the example in FIG. 8, the partition pattern 37 may be arranged such as to extend from the second specific pattern 41 in the first edge 34a to the opposing second specific pattern 41 in the second edge 34a, for all second specific patterns 41. Alternatively, a single partition pattern 37 or more may be arranged such as to extend from the second specific pattern 41 in the first edge 34a to the opposing second specific pattern 41 in the second edge 34a, for some of the second specific patterns 41.

Figure 9:
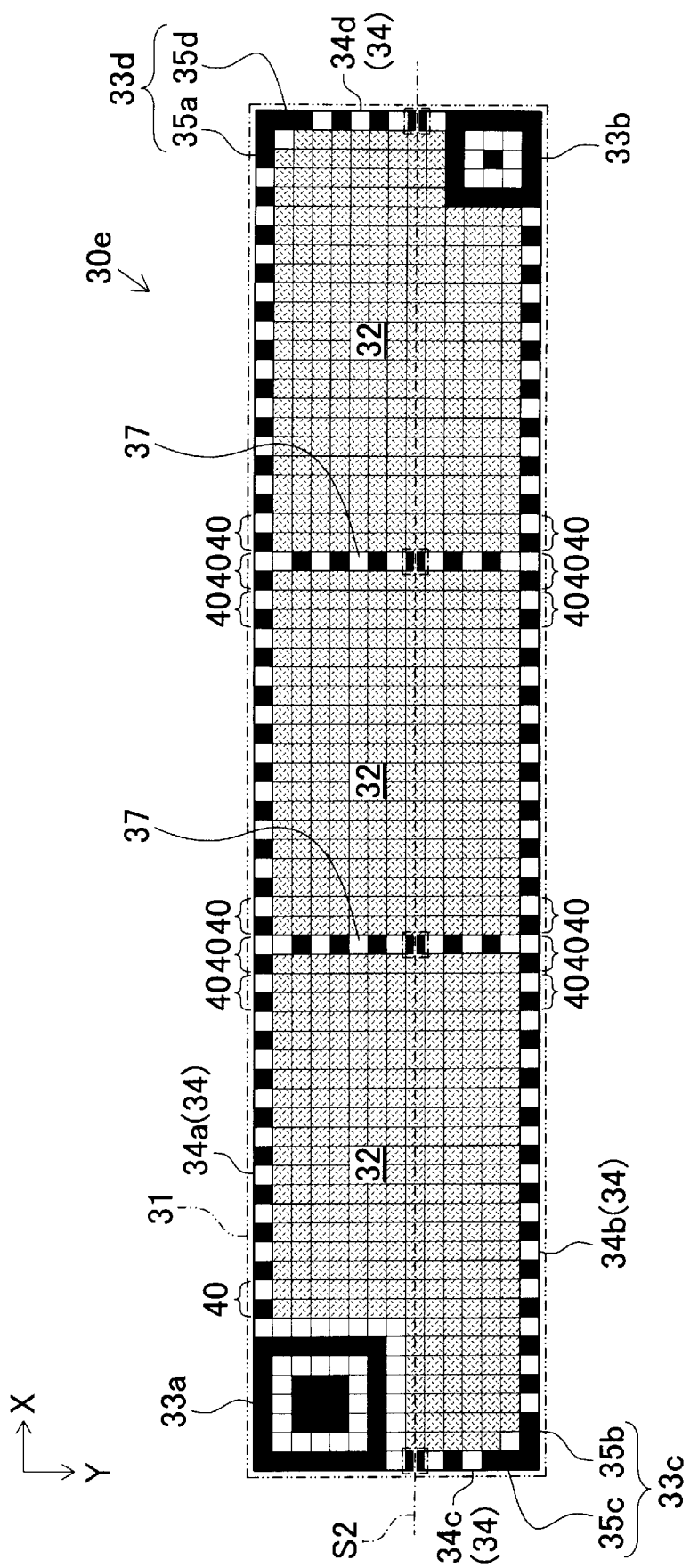
FIG. 9 is an explanatory diagram of a two-dimensional code in a second variation example according to the second embodiment.

As a second variation example according to the present embodiment, as in a two-dimensional code 30e shown as an example in FIG. 9, even when the second specific patterns 41 are not arranged, the partition pattern 37 may be arranged such as to extend from a cell in the first edge 34a to an opposing cell in the second edge 34b. In this configuration, a single partition pattern 37 may be arranged such as to extend from a cell in the first edge 34a to an opposing cell in the second edge 34b. Alternatively, two or more partition patterns 37 may be arranged such as to extend from cells in the first edge 34a to opposing cells in the second edge 34b. In this case as well, in the third edge 34c and the fourth edge 34d, the cells that configure at least the intermediate portions are of the same type as the cells in the partition pattern 37 in the opposing positions in the direction (X direction in FIG. 9) along the first edge 34a and the second edge 34b. Therefore, the cell coordinates of each cell in relation to the direction along the first edge 34a and the second edge 34b can be easily accurately determined with reference to the intermediate portions of the third edge 34c and the fourth edge 34d, in addition to the partition patterns 37.

Third Embodiment

Next, a two-dimensional code according to a third embodiment will be described with reference to FIG. 10 and FIG. 11.

The third embodiment mainly differs from the above-described second embodiment in that the size of the code area is identified based on the position at which the partition pattern comes into contact with the first edge. Therefore, constituent sections that are essentially identical to those of the two-dimensional code according to the second embodiment are given the same reference numbers. Descriptions thereof are omitted.

According to the present embodiment, to identify the size (also referred to, hereafter, as code size) of the code area 31 at an early stage, the position at which the partition pattern 37 comes into contact with the first edge 34a is used with reference to an end-portion cell (a dark-colored cell in FIG. 10) Cs that configures an end portion of the first edge 34a on the first position detection pattern 33a side. Specifically, the number of cells that are arrayed in one direction from the end-portion cell Cs to a cell (the dark-colored cell in the center of the second specific pattern 41) that is in contact with the cell 37a in the end portion of the nearest partition pattern 37 is determined as a size-identification cell count. The code size is identified based on the size-identification cell count.

To enable the code size to be identified in this manner, according to the present embodiment, a two-dimensional code is generated such that the code size and the size-identification cell count correspond one-to-one. Specifically, as shown in the example in FIG. 11A, the relationship between the code size and the size-identification cell count is determined in advance. The two-dimensional code according to the present embodiment is generated such that, when the code size is determined and the size-identification cell count is uniquely determined from the code size as a result, the position of the partition pattern 37 in the code area 31 is prescribed based on the size-identification cell count. The code size is not limited to that in which only lateral size (size in the direction along the first edge 34a) changes based on the size-identification cell count, as in the example shown in FIG. 11 A. Only vertical size (size in the direction along the third edge 34c) may change based on the size-identification cell count. Alternatively, both the lateral size and the vertical size may change based on the size-identification cell count.

Figure 10:
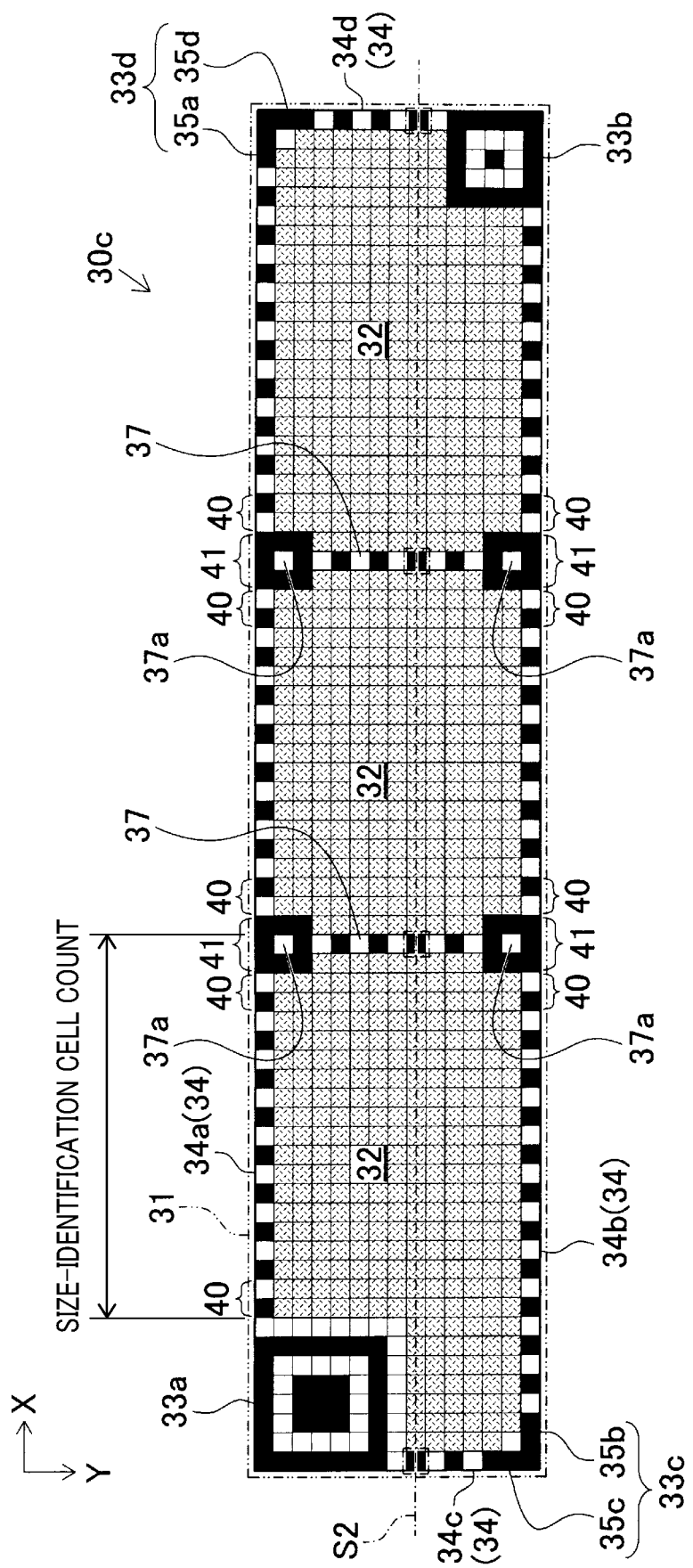
FIG. 10 is an explanatory diagram of a two-dimensional code according to a third embodiment.

Because the two-dimensional code is generated in this manner, when the two-dimensional code 30c shown in FIG. 10 is imaged, the size-identification cell count is determined to be 20 cells upon detection of the code area 31. Based on the relationship shown in FIG. 11A, the code size is identified as being 15×71. In a similar manner, when the size-identification cell count is determined to be 22 cells based on the two-dimensional code that has been imaged, the code size is identified as being 15×43. When the size-identification cell count is determined to be 24 cells based on the two-dimensional code that has been imaged, the code size is identified as being 15×99.

In this way, according to the present embodiment, the code size of the code area 31 is determined based on the position at which the partition pattern 37 comes into contact with the first edge 34a. Therefore, the code size can be immediately identified as a result of determination of the position in the first edge 34a at which the cell 37a in the end portion of the partition pattern 37 comes into contact. That is, when the code area 31 is detected, the code size of the code area 31 is identified simply through determination of the number of cells that are arrayed in one direction from a cell in a predetermined position, such as the end-portion cell Cs that configures the end portion of the first edge 34a to the cell that is in contact with the cell 37a in the end portion of the partition pattern 37. Therefore, the code size of the code area 31 can be identified at an early stage without the cell array being two-dimensionally determined. Because the code size of the code area 31 can be identified in this manner, even should a portion that appears to be a collection of cells be present near the code area 31, the process for detecting the code area 31 is not performed on this portion. Therefore, unnecessary processing is reduced. Processing time related to the reading process can be shortened.

The two-dimensional code according to the present embodiment is not limited to the two-dimensional code that is generated such that the code size and the size-identification cell count correspond one-to-one. The two-dimensional code may be generated such that the code size and the size-identification cell count correspond one-to-many. That is, all that is required is that the code size be uniquely identified from the size-identification cell count. For example, as shown in the example in FIG. 11B, when the size-identification cell count determined from the two-dimensional code that has been imaged is 19 cells or 20 cells, the code size is identified as being 15×71. In a similar manner, when the size-identification cell count determined from the two-dimensional code that has been imaged is 21 cells or 22 cells, the code size is identified as being 15×43. When the size-identification cell count determined from the two-dimensional code that has been imaged is 24 cells, the code size is identified as being 15×99.

In addition, the size-identification cell count is not limited to being determined as the number of cells that are arrayed in one direction from the end-portion cell Cs in the first edge 34a to the cell that is in contact with the cell 37 in the end portion of the partition pattern 37. For example, the size-identification cell count may be determined as the number of cells that are arrayed in one direction from a predetermined cell, such as a cell configuring a corner portion of the code area 31, to the cell that is in contact with the cell 37a in the end portion of the partition pattern 37.

In addition, the two-dimensional code is not limited to that in which the overall code size (vertical×lateral) of the code area 31 is associated with the size-identification cell count. For example, the lateral size (the size in the direction along the first edge 34a) of the code size of the code area 31 may be associated with the size-identification cell count.

In addition, the code size of the code area 31 is not limited to being determined by the size-identification cell count as described above. For example, a method other than the cell count, such as distance measurement using pixel count, may be used to determine the position at which the partition pattern 37 comes into contact with the first edge 34a, with reference to a predetermined position, such as the first position detection pattern 33a. The code size may be determined based on the determined position.

The present invention is not limited to the above-described embodiments, variation examples, and the like. For example, the present invention may be implemented in the following manner.

(1) Application of the present invention is not limited to the two-dimensional code that is configured by two types of cells, that is, the light-colored cells and the dark-colored cells arrayed in a matrix. The present invention may be applied to a two-dimensional code that is configured by three or more types of cells arrayed in a matrix, such as a color code.

(2) The second edge 34b is not limited to being configured such that regarding the portion of the first edge 34a in which the specific pattern 40 is repeated and the portion of the second edge 34b in which the specific pattern 40 is repeated, the cells in the opposing positions are of the same type. The second edge 34b may be configured such that the types of the cells in the opposing positions have a predetermined relationship at all times. For example, when two types of cells, that is, the light-colored cells and the dark-colored cells are used, as the predetermined relationship, the dark-colored cell may be placed as the cell in the second edge 34b in the position opposing the light-colored cell in the first frame 34a. The light-colored cell may be placed as the cell in the second edge 34b in the position opposing the dark-colored cell in the first frame 34a.

PARTIAL REFERENCE SIGNS LIST 30, 30a to 30e: two-dimensional code
31: code area
33a: first position detection pattern
33b: second position detection pattern
34: outer edge
34a: first edge
34b: second edge
34c: third edge
34d: fourth edge
35a, 35b, 35c, 35d: end-portion pattern
36a, 36b, 36c, 36d: end-portion pattern
37: partition pattern
40, 40a: specific pattern
41: second specific pattern

What is claimed is:

1. A two-dimensional code, comprising:
a rectangular code area formed on or in a carrier medium, the rectangular code area represented by outer edges, the outer edges including a first edge and a second edge, the first and second edges being parallel with each other;
a plurality of types of cells arrayed in a matrix within the rectangular code area, the plurality of types of cells includes cells arranged along each of the first and second edges in the rectangular code area,
wherein
the cells arrayed along each of the first and second edges are arrayed in a single row with sides in contact, and include a specific pattern i) composed of an array of two or more differing types of cells, which are part of the plurality of types of cells, and ii) continuously repeated in at least an intermediate portion of each of the first and second edges.

2. The two-dimensional code according to claim 1, wherein:
a first position detection pattern arranged to detect the code area is arranged in one corner portion of the code area; and
the first edge is configured such that the specific pattern is repeated until the first position detection pattern is reached.

3. The two-dimensional code according to claim 2, wherein:
a second position detection pattern arranged to detect the code area is arranged in a corner portion of the code area that is diagonal to the first position detection pattern, the second position detection pattern having an array differing from that of the first position detection pattern; and
the second edge is configured such that the specific pattern is repeated until the second position detection pattern is reached.

4. The two-dimensional code according to claim 1, wherein:
the first edge is configured such that at least either of a starting end and a tail end of the first edge is composed of an end-portion pattern that differs from the specific pattern.

5. The two-dimensional code according to claim 1, wherein:
the second edge is configured such that at least either of a starting end and a tail end of the second edge is composed of an end-portion pattern that differs from the specific pattern.

6. The two-dimensional code according to claim 1, wherein:
a one or more partition pattern or more is arranged within the code area such as to extend from the first edge to the second edge in an opposing direction orthogonal to the first edge and the second, the partition patterns having a same cell array.

7. The two-dimensional code according to claim 6, comprising:
a third edge and a fourth edge that oppose each other such as to be orthogonal to the first edge and the second edge, among the outer edges of the code area, configured such that the cells that configure at least an intermediate portion are of a same type as the cells in the partition pattern in opposing positions in a direction along the first edge and the second edge.

8. The two-dimensional code according to claim 6, wherein:
the code area has a size which is determined based on a position at which the partition pattern comes into contact with the first edge.

9. The two-dimensional code according to claim 1, wherein:
the cells in the portion of the first edge in which the specific pattern is repeated and the cells in the portion of the second edge in which the specific pattern is repeated in opposing positions in an opposing direction orthogonal to the first edge and the second edge are of a first same type.

10. The two-dimensional code according to claim 9, wherein:
the first edge and the second edge are configured such that a single, or two or more, second specific patterns appear during the repetition of the specific pattern, the second specific pattern having an array differing from that of the specific pattern; and
the cells in the second specific pattern in the first edge and the cells in the second specific pattern in the second edge in opposing positions in the opposing direction are of a second same type.

11. The two-dimensional code according to claim 10, wherein:
the first edge and the second edge are each configured such that one or more second specific patterns appear; and
a partition pattern is arranged such as to extend from the second specific pattern in the first edge to the second specific pattern in the second edge in the opposing direction, the partition patterns having a same cell array.

12. The two-dimensional code according to claim 11, wherein:
the second specific pattern is configured by three cells of the same type being arrayed;
the partition pattern is configured such that a cell in an end portion that is in contact with a cell in the center of the second specific pattern is of a type differing from the cells that configure the second specific pattern; and
cells that surround the cell in the end portion are configured by cells of the same type as the cells that configure the second specific pattern.

13. The two-dimensional code according to claim 11, comprising:
a third edge and a fourth edge that oppose each other such as to be orthogonal to the first edge and the second edge, among the outer edges of the code area, configured such that the cells that configure at least an intermediate portion are of a same type as the cells in the partition pattern in opposing positions in a direction along the first edge and the second edge.

14. The two-dimensional code according to claim 11, wherein:
the code area has a size which is determined based on a position at which the partition pattern comes into contact with the first edge.

15. The two-dimensional code according to claim 1, wherein:
the plurality of types of cells are composed of light-colored cells and dark-colored cells; and
the specific pattern is composed of a set of the light-colored cell and the dark-colored cells.

16. The two-dimensional code according to claim 1, wherein:
the code area is rectangular; and
the first edge and the second edge configure long sides of the code area.

17. The two-dimensional code according to claim 2, wherein:
the first edge is configured such that at least either of a starting end and a tail end of the first edge is composed of an end-portion pattern that differs from the specific pattern.

18. The two-dimensional code according to claim 2, wherein:
the second edge is configured such that at least either of a starting end and a tail end of the second edge is composed of an end-portion pattern that differs from the specific pattern.

19. The two-dimensional code according to claim 2, wherein:
a one or more partition pattern or more is arranged within the code area such as to extend from the first edge to the second edge in an opposing direction orthogonal to the first edge and the second, the partition patterns having a same cell array.

20. The two-dimensional code according to claim 19, comprising:
a third edge and a fourth edge that oppose each other such as to be orthogonal to the first edge and the second edge, among the outer edges of the code area, configured such that the cells that configure at least the intermediate portion are of a same type as the cells in the partition pattern in opposing positions in a direction along the first edge and the second edge.

21. The two-dimensional code according to claim 1, wherein:
each of the cells represents a display unit of data to be recorded in the rectangular code area; and the cells include cells of the data encoded in the rectangular code area and decoded when being read.

* * * * *